May 22, 1956  A. DUCROT  2,746,520
RECLINING CHAIR
Filed March 31, 1953  9 Sheets-Sheet 1
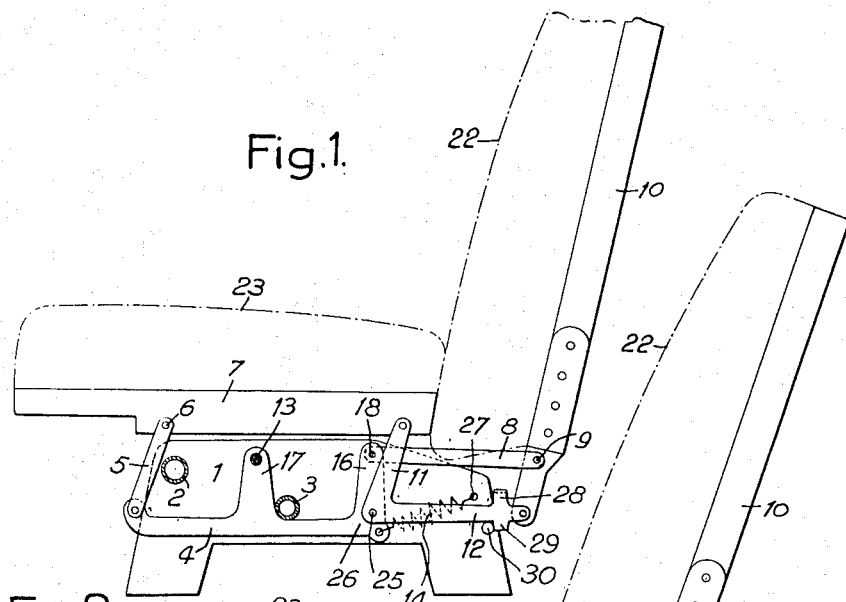
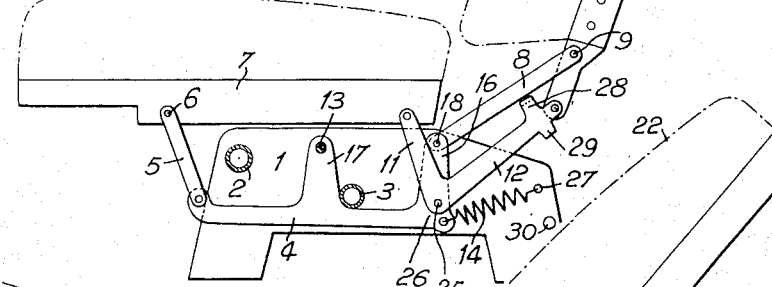
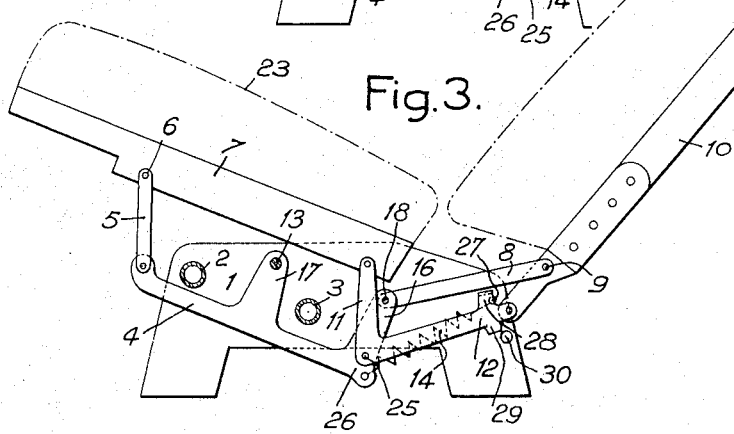

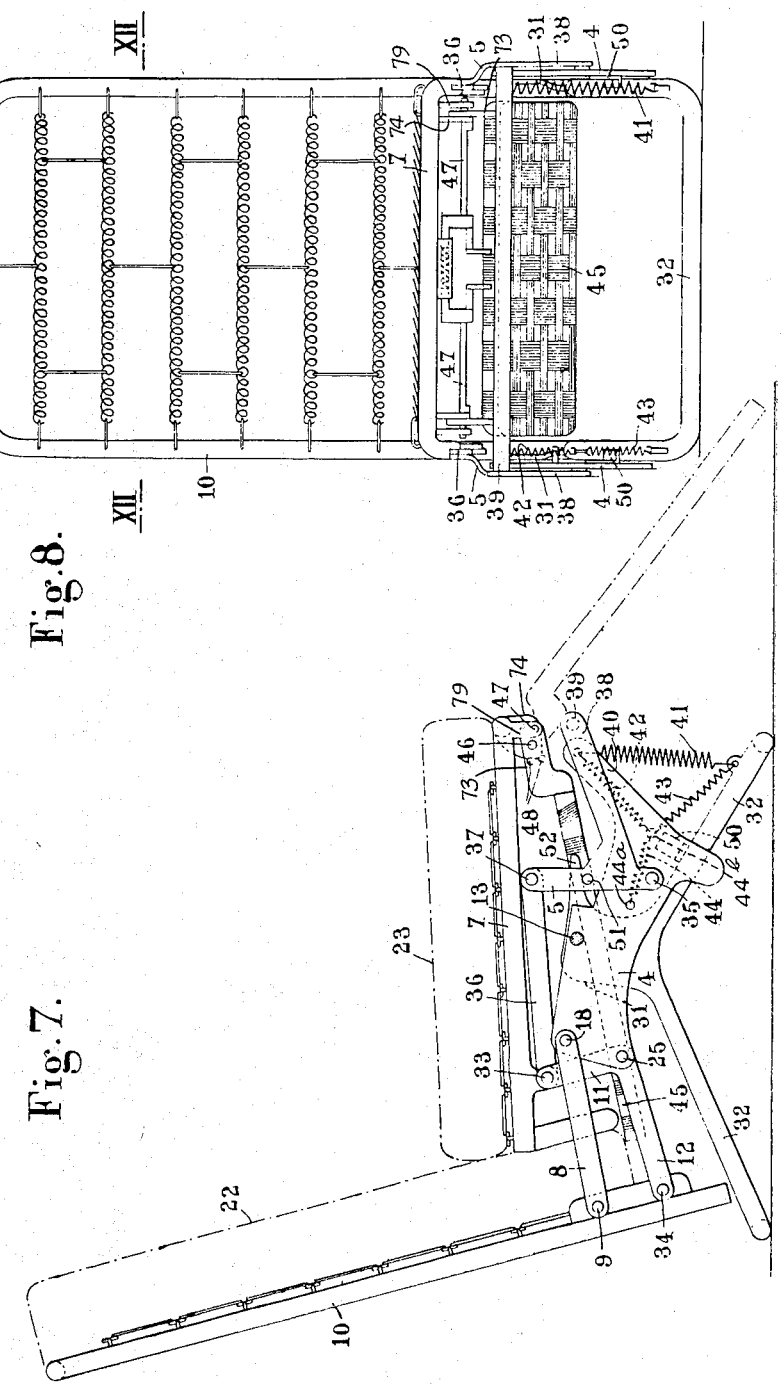

May 22, 1956     A. DUCROT     2,746,520
RECLINING CHAIR

Filed March 31, 1953     9 Sheets-Sheet 5

May 22, 1956 A. DUCROT 2,746,520
RECLINING CHAIR
Filed March 31, 1953 9 Sheets-Sheet 6
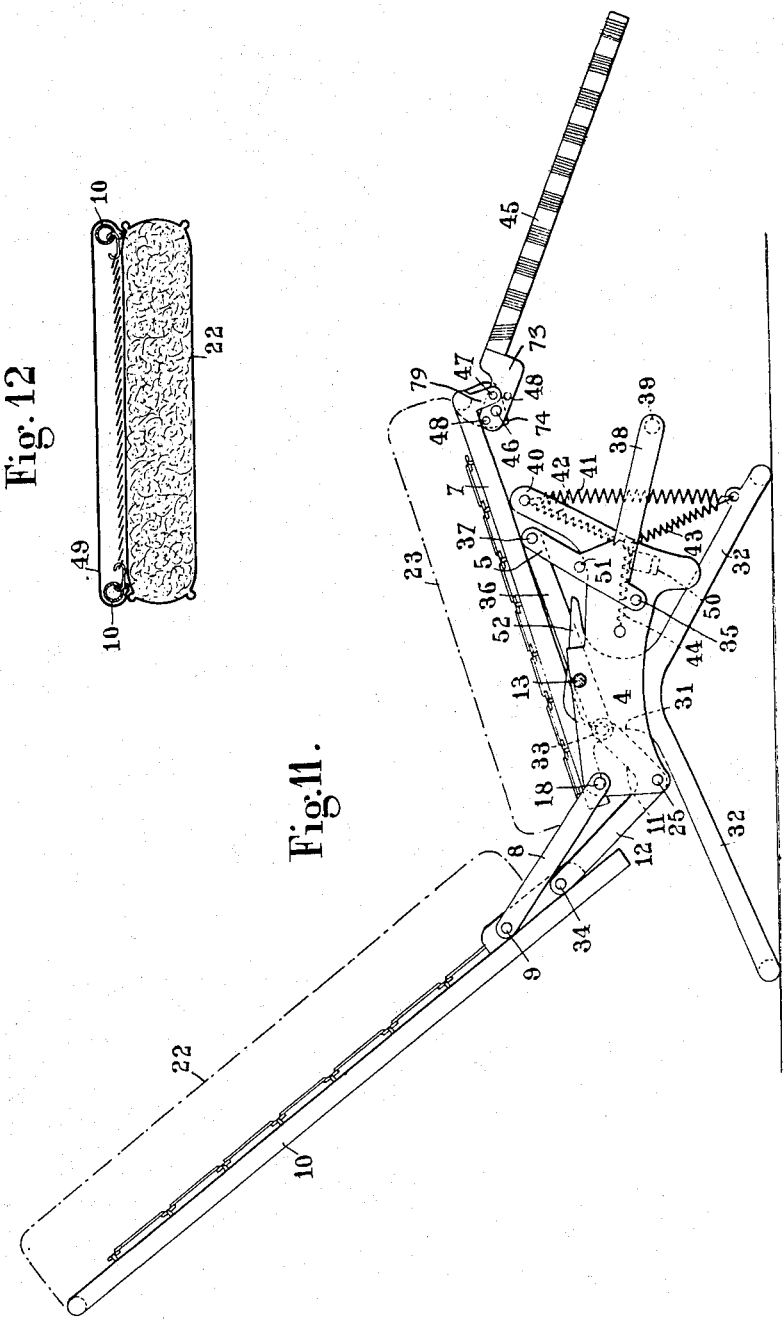

May 22, 1956  A. DUCROT  2,746,520
RECLINING CHAIR
Filed March 31, 1953  9 Sheets-Sheet 7
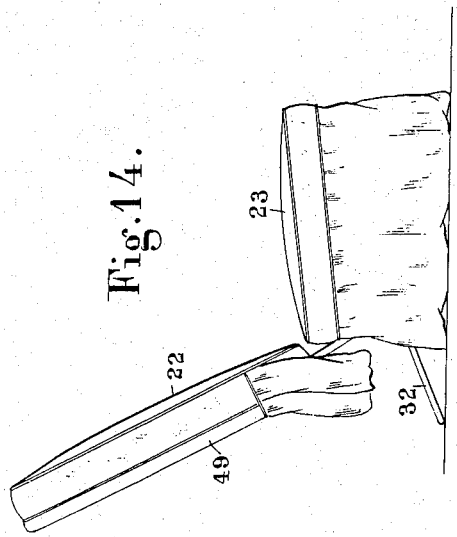
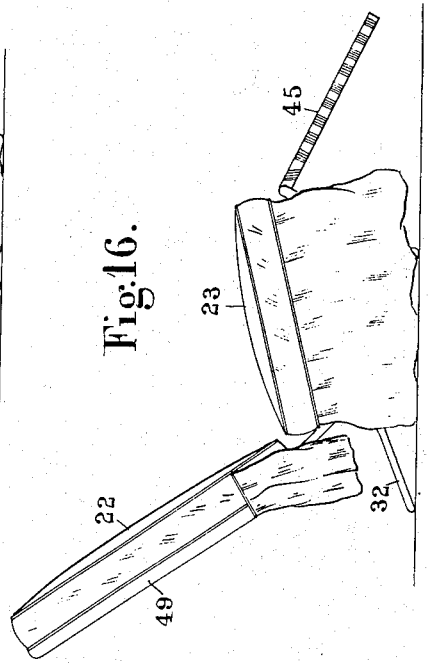
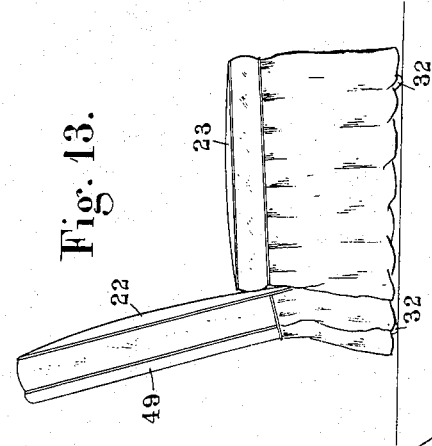
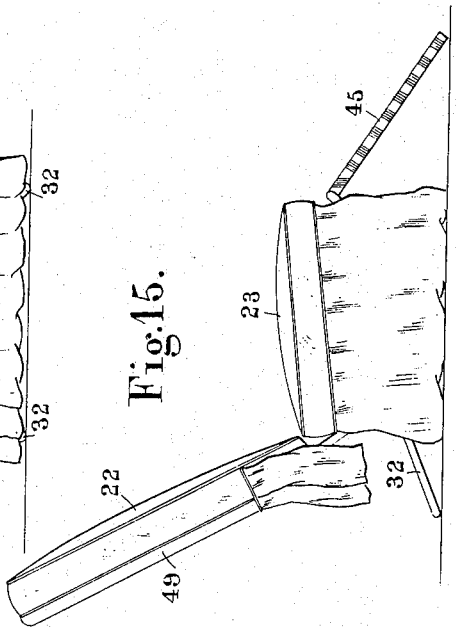

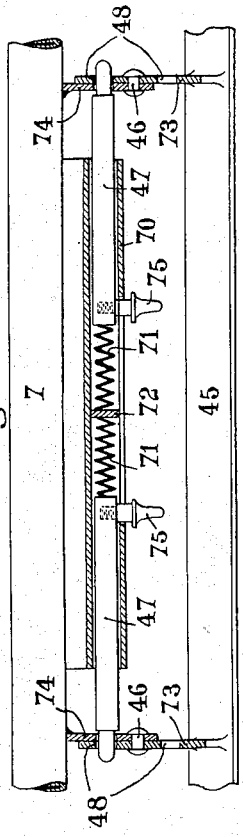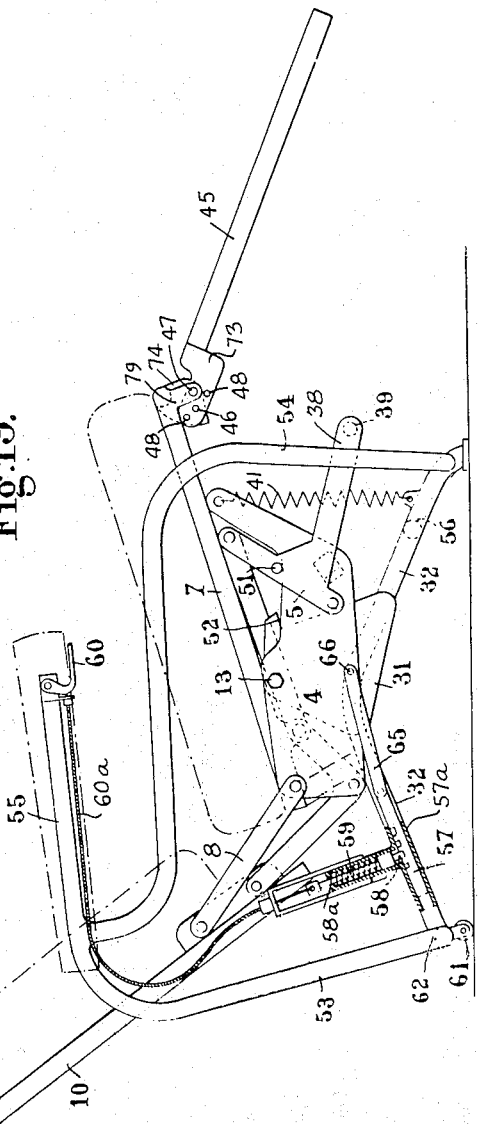

United States Patent Office 2,746,520
Patented May 22, 1956

2,746,520
RECLINING CHAIR
Albert Ducrot, Paris, France
Application March 31, 1953, Serial No. 345,836
Claims priority, application France April 25, 1952
6 Claims. (Cl. 155—105)

My invention relates to a chair which can be set in several different positions, viz: a stable normal position, a stable position with extended seat and back, and a position in which the seat-and-back system can be rocked about fixed horizontal pivots rigid with the fixed underframe.

The chair has a horizontal axis which is located close to the centre of gravity of the chair with an occupant thereon for better convenience in rocking the same.

Said chair consists of an underframe having a pair of horizontal coaxial pivot pins secured thereto at either side thereof, a pair of rigid frames for the seat and the back respectively, a pair of side plates pivoted on the pins carried by said underframe and linked respectively to the seat frame and the back frame, and stop studs rigid with the underframe.

Said studs are designed to stop the oscillatable parts in the normal position of the chair and to clear the same when the back is displaced relative to the seat, whereby the whole system is made free to rock.

Embodiments of a convertible chair designed according to my invention will be described hereinafter by way of example, reference being had to the appended drawing in which:

Figure 1 is a side elevational view of a chair with the back in low upright position.

Figure 2 is a similar view of the chair with the back in high upright position.

Figure 3 is a similar view of the chair in its "rocking chair" condition.

Figure 7 is a side elevational view of a modification showing the chair-setting mechanism in the "low-back straight-chair" condition of the chair provided with a leg rest.

Figure 8 is a corresponding front view of the chair framework.

Figure 11 is a view similar to Fig. 10 and shows the chair in its rocked position.

Figure 12 is a cross-sectional view taken on line XII—XII in Fig. 8.

Figures 13, 14, 15 and 16 illustrate the finished chair in its "low-back straight," "high-back straight," "rocking" and "easy" positions respectively.

Figure 18a is an enlarged view showing a further form of the pivotal connection of the leg rest to the seat.

Figure 19 is a side elevational view of the chair of Figs. 17 and 18 adjusted for use as an easy chair, i. e. with its leg rest unfolded.

Figure 4:
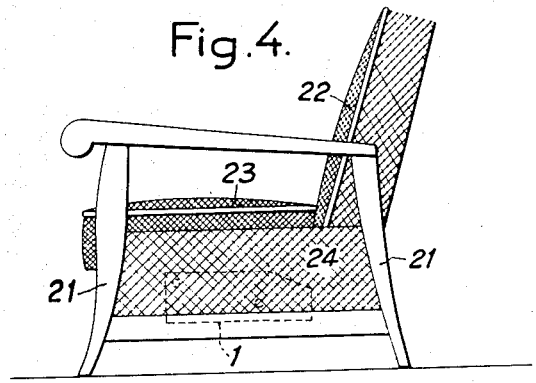
Figures 4 to 6 are corresponding side elevational views of the upholstered chair.
Figure 5:
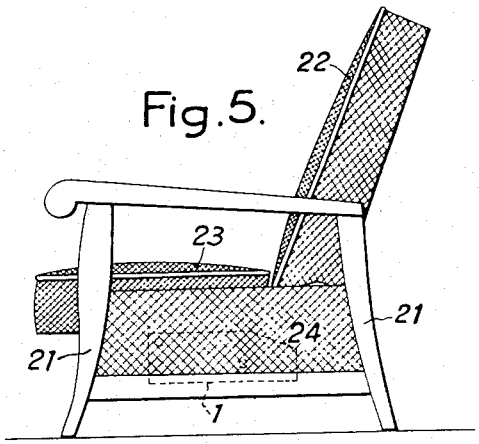
Figure 6:
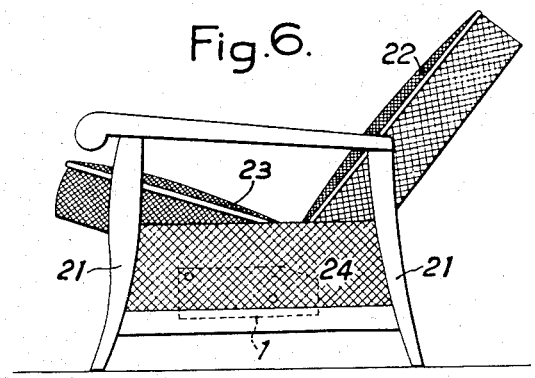

In the embodiment shown in Figs. 1 to 6 the chair proper is composed of a seat frame 7 and a back frame 10 which are pivotally connected to each other in such a manner that they can assume various angular positions relative to each other. Said frames are connected with a framework composed of a pair of parallel side plates 4 mounted for free oscillatory motion on horizontal pivot pins 13.

Said pins are carried by an underframe composed of a pair of parallel stiff plates, e. g. rectangular metal plates 1 braced to each other by horizontal tubular cross ties 2, 3 of a length corresponding to the width of the seat 7 and the back 10.

Each side plate has the shape of an F lying on its back of which the median bar 17 is mounted on the pivot pin 13 of the side plate while the leg of the F-shaped side plate is pivotally connected at its free end to one end of a link 5 the opposite end of which is pivotally connected to the front end of the seat frame 7 and the top arm or bar 16 of the F-shaped side plate is pivotally connected at 18 with one end of a link 8 which is pivotally connected at its opposite end 9 with the frame 10 of the back unit. Pivotally secured to the lower corner 26 of the F-shaped side plate 4 at 25 is a bell-crank lever one arm 11 of which is pivotally connected with the rear portion of the seat frame 7 while its opposite arm 12 is pivoted to the bottom end of the back frame 10.

The link 8 together with the arm 12 of the bell-crank lever provide a link motion by means of which the back can move relative to the seat as shown in the drawing.

Attached to the aforesaid upper corner 26 of the F-shaped side plate is one end of a tension spring 14 the other end of which is attached at 27 to the rear portion of the underframe.

It will be appreciated that in this manner the displacements of the seat and the back frames in parallel motion are synchronal and that their amplitudes depend upon the distances of the link pivots on plate 4 from pivot 13.

The pins 13 on which the side plates 4 are pivoted to the underframe 1 are located substantially on a level with the centre of gravity of the loaded chair. Consequently, the side plate 4 is able to swing about said pins. However, with the gear positioned as shown in Fig. 1, said side plates 4 cannot swing counterclockwise on account of the link 5 engaging the cross tie 2; nor can it swing in the opposite direction on account of the engagement of the arm 17 with the cross tie 3.

Catches 29 may be provided on the arms 12 of the bell-crank levers which cooperate with stops 30 on the underframe 1 to keep the back in the position shown in Fig. 1; this catch-and-stop system is no longer effective in the positions shown in Figs. 2 and 3.

In the position shown in Figs. 1 and 4 the side plate 4 is locked. As a consequence of the back 22 being pulled upwards, the bell-crank lever 11, 12 is swung about its pivot 25 relative to the still unmoved side plate, and the link 5 is moved forwards together with the seat frame 7. The seat 23 is thus shifted forwards to the position shown in Figs. 2 and 5, in which the bell crank 11, 12 being disengaged the side plate 4 is enabled to rock clockwise about pin 13. In the course of this rocking movement the links 5, 8 and the bell-crank lever 11, 12 rock in turn about their pivots, the amplitude of this rocking movement being limited by the pull of the return spring 14 and the engagement of members 4, 8 and 12 with the stops 2, 28 and 30 (see Figs. 3 and 6).

In this manner, the whole chair is mounted for rocking motion about the pins 13 rigid with the sides of the underframe 1, the whole chair-setting gear being situated below the seat frame and the height of the underframe being sufficient to allow the whole chair-setting gear to move freely.

In the embodiment shown in Figs. 7 to 16, the seat frame 7 is attached to a pair of side plates 4 each of which is mounted for rocking motion on a pin 13 carried by an underframe 31 including tubular legs 32.

Pivoted to each side plate at the rear upper corner thereof as indicated at 18 is one end of a link 8 the other end of which is pivoted at 9 to the back frame 10, and pivoted at 25 in the rear lower corner of the plate is a bell-crank lever one arm 11 of which is pivoted at 33 to the seat frame 7 while its other arm 12 is pivoted at 34 to the back frame 10. Pivoted at 35 to the forward end of said side plate is a bell-crank lever one arm 5 of which is pivoted by a cross tie 37 to a link 36 the opposite end of which is pivoted at 33 to the seat frame 7 while the other arm 38 of said bell-crank lever is secured by a cross tie 39 to the corresponding arm of the other bell-crank lever.

Each side plate 4 is formed at its front end with a leg 40 the end of which is connected by a spring 41 with the front leg 32 of the underframe. Three further springs 42, 43, 44 which are shorter than spring 41 are interposed between the plates 4 and the legs of the underframe which become progressively effective in the course of the rocking motion. Springs 42 and 43 are connected respectively at one end to the leg 40 of the plate 4 and to the front leg 32 while one end of spring 44 is connected to the plate 4 at 44a. The opposite ends of springs 42, 43 and 44 are connected together at 44b.

Figure 9:
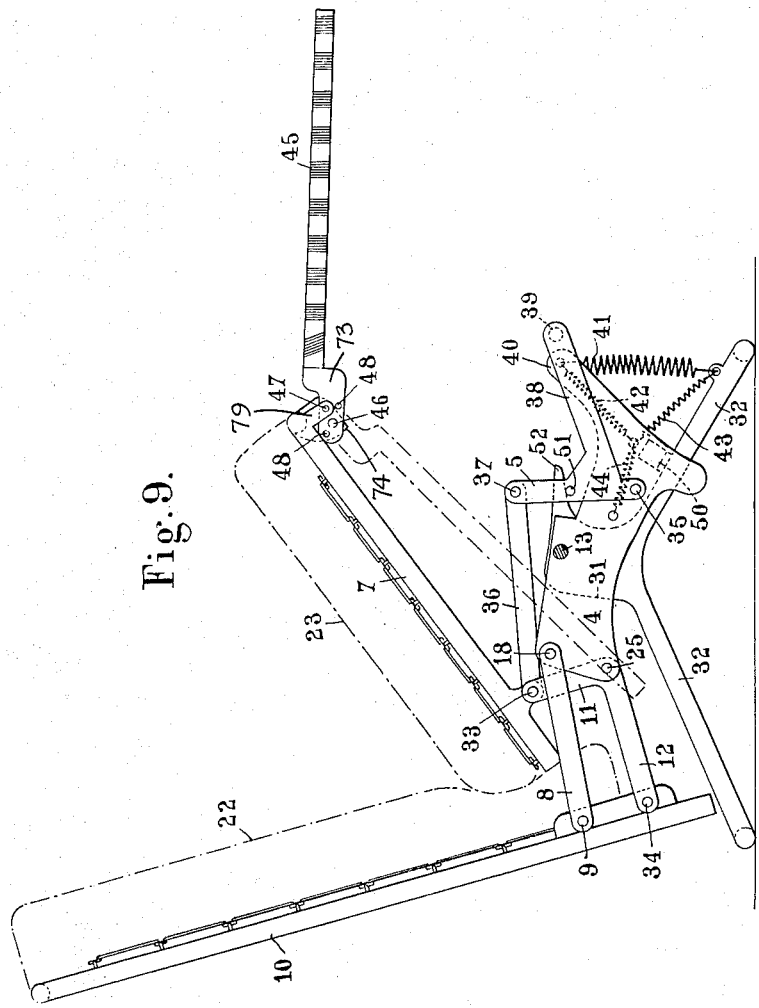
Figure 9 is a view similar to Fig. 7 and shows the chair with its seat fully lifted and the leg rest partly unfolded.

The frame 7 of the seat 23 is pivotally connected with the back 10 by the bell-crank lever 11, 12 which is pivoted to said seat frame at 33 and the front end of the frame rests on the cross tie 37. This makes it possible to swing the frame 7 upwards about pivot pins 33 as shown in Fig. 9 and consequently to unfold the leg rest 45. The latter is mounted with a considerable overhang for swinging motion about pivot pins 46 rigid with the front portion of the seat frame and can be set in various angular positions relative to the same by the engagement of a rod 47 through a hole in the seat frame and a series of holes provided in the leg-rest sides around the pivot pins 46. The said leg rest is so designed that it can be swung backwards against the under side of the seat frame 7 in whatever position the chair is set and unfolded forwards and set at various angles relative to the seat frame.

As shown in Fig. 12, the stuffing of the back 22 and preferably also the seat 23 may be provided with a sleeve 49 to be stretched around the sides of the tubular frames 7 and 10 for convenience in fixing and removing said stuffings.

The operation is as follows:

With the chair set in its normal position as shown in Fig. 7 the whole structure is fixed since on the one hand a bracket 50 on each side plate 4 rests on the leg 32, whereby the seat is prevented from moving down, and on the other hand a stud 51 on arm 5 engages an extension 52 of the underframe 31, whereby the side plate is prevented from rocking backwards. Nevertheless, in this condition of the chair, it remains possible to lift the seat 7 for the purpose of unfolding the leg rest 45 as illustrated in Fig. 9.

Figure 10:
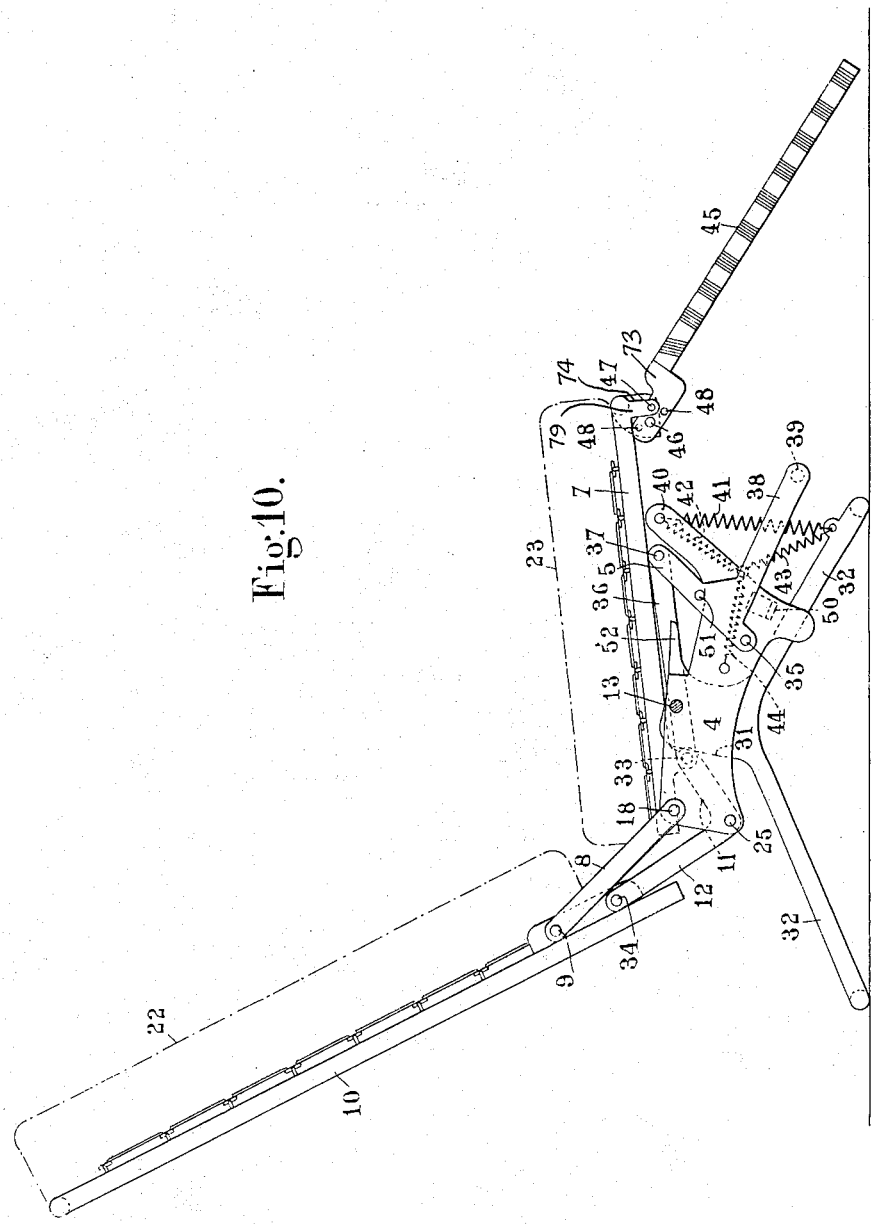
Figure 10 is a view similar to Fig. 7 and shows the framework of the chair in the "rocking-chair" condition of the same.

By depressing the cross tie 39, each of the bell-crank levers 38 is caused to rock about its pivot pin 35 (see Figs. 10 and 11), whereby the stud 51 is moved clear of the extension 52, and the bell-crank lever 11, 12 is swung about its pivot pin 25 through the medium of link 36. The leg rest 45 is swung forwards when the back 22 is lifted and an increased back rest area becomes available to the occupant (Fig. 10).

In this position of the parts the whole chair can be rocked about the pivot pins 13 against the action of the return springs 41, 42, 43, 44 and the leg rest 45 can be folded or unfolded.

With the chair dressed as shown in Figs. 13 to 16 it can be set in the various positions illustrated.

Figures 17, 18:
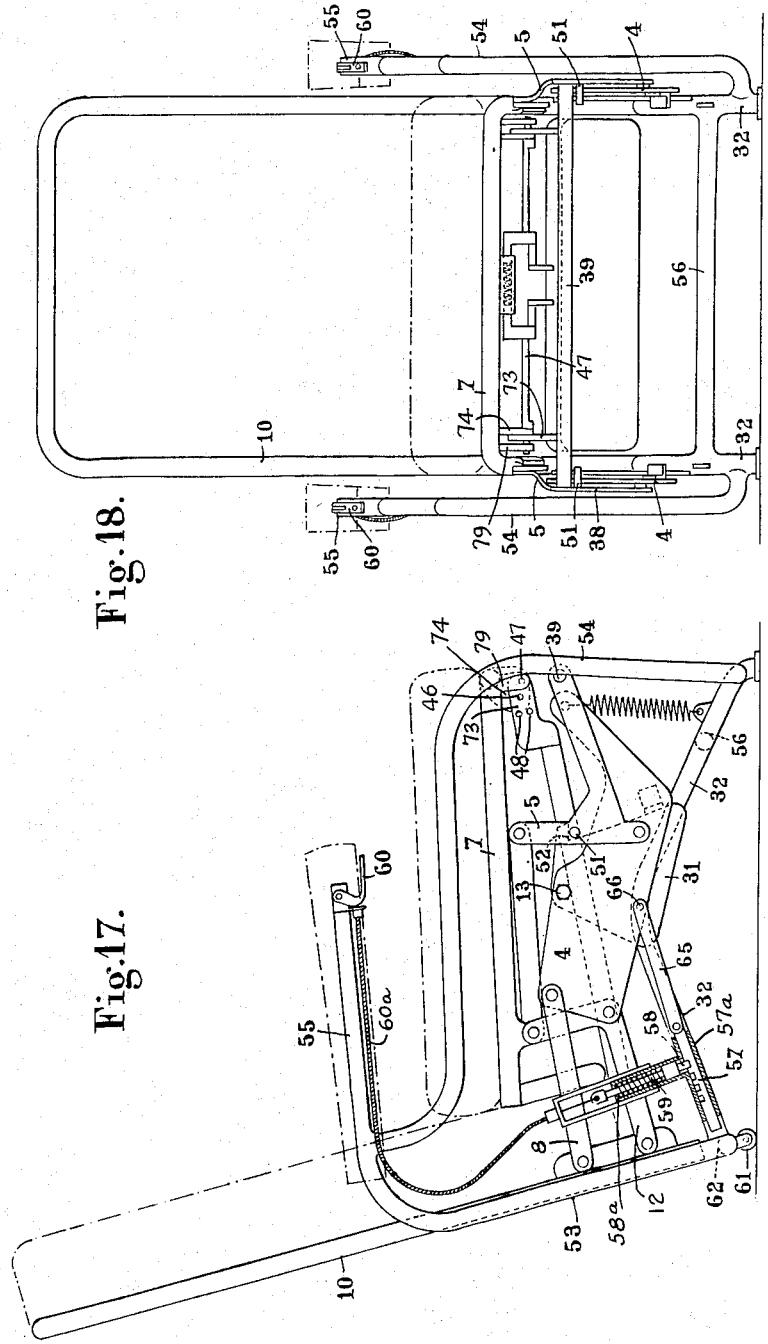
Figure 17 is a side elevational view of the chair framework of a modification in the most compacted condition of the chair.
Figure 18 is the corresponding front view.

In the embodiment of Figs. 17, 18 and 19 the underframe is of metal tubular construction and comprises legs 32 disposed at opposite sides of the chair and connected by a front cross bar 56 and a rear cross bar 62 so that the frame provides a rigid structure. Uprights 53 and 54 extending upwardly from the legs 32 at the front and rear respectively of the chair support armrests 55. The front cross bar 56 is sufficiently low to avoid interfering with the movement of the ball cranks 5, 38. The seat and back supporting mechanisms and connections are essentially the same as in Figs. 7 to 11, it is hence unnecessary to repeat the description of these parts.

A rack 57 which is longitudinally slidable in a fitting 57a secured on the tubular leg 32 of the underframe, cooperates with a bolt 58 guided in a laterally projecting sleeve portion 59 of the fitting 57a and actuated from a distance. Pivoted to one end of said rack is one end of a link 65 the other end of which is pivoted at 66 to a point of the side plate 4 which is situated below the pivot pin 13 on which plate 4 is mounted. A spring 58a is provided for the purpose of engaging the bolt 58 into one of the notches in the rack 57 and consequently locking the side plate. In this manner, the parallel side plates are kept in a desired position corresponding to a certain inclination of the back and the seat relative to each other and to the underframe of the chair. Actuating means for disengaging the bolt from the rack to permit adjustment of the chair is shown as a bolt-actuating lever 60 pivotally mounted on the under side of the arm rest 55 and connected by a Bowden cable 60a to the bolt 58.

The legs 32 may be fitted with casters 61 to make the piece of furniture more easily movable.

As the cross tie 39 is moved to disengage the studs 51 the frames 7 and 10 are still locked by the bolt 58 which prevents the side plate 4 from rocking about its pivot pin 13. It is only necessary to actuate the lever 60 to disengage the bolt 58 and thus to allow the inclination of the seat and the back relative to each other to be varied within the limits of the rack 57.

It is possible to avail one's self of the leg rest in any position of the back and the seat.

Fig. 18a illustrates a further form of the connection between the seat frame and the frame 45 of the leg rest shown in Figs. 8 and 18, the support elements 79 of Figs. 17–19 being omitted. In this structure, the two rods 47 are slidably received in a tube 70 welded to the under side of the front cross bar of the seat frame 7 and are urged outwards by a pair of coil springs 71 which bear against a fixed median wall 72. The end of each rod 47 engages one of a plurality of holes 48 drilled in a plate 73 welded to the rear cross bar of the leg rest frame. The plates 73 are pivoted at 46 to sectors 74 rigid with the cross bar of the seat frame. Handles 75 are provided for the actuation of the rods 47.

What I claim is:

1. A chair having a seat and back and capable of being adjusted from a normal position to a second position with the back raised and the seat moved forwardly and to a rocking-chair position with the seat inclined downwardly rearwardly and the back inclined upwardly rearwardly, comprising an underframe, horizontal coaxial pivot pins rigid with said underframe and located at opposite sides of said underframe substantially in vertical alignment with the center of gravity of the loaded seat, a pair of rigid frames respectively for the seat and back of the chair, a pair of vertical side plates pivoted respectively by said pivot pins on said underframe, a first bell crank lever pivoted at its apex to the lower rear portion of each side plate and having a rearwardly extending arm pivotally connected to the lower end of the back frame and an upwardly extending arm pivotally connected to the rear portion of the seat frame, a link pivoted to the upper rear portion of each side plate and to the back frame respectively, the connection of said link to the back frame being at a point above that of said first bell crank, a second bell crank lever pivoted at its apex to the forward portion of each side plate and having an upwardly extending arm and a forwardly extending arm, cross-ties connecting the corresponding arms of said second bell cranks, the cross tie connecting said upwardly extending arms of the second bell cranks providing a support for the forward portion of the seat frame, linkage connecting the upwardly extending arms of said second bell cranks with the upwardly extending arms of said first bell cranks, a stop on each side plate to engage the underframe in normal position of the seat, a stud rigid with each of said second bell cranks, abutment portions of the underframe engaging said studs in the normal position of the chair and cooperating with said stops to hold said side plates in fixed position, said studs being moved away from said abutments to free said side plates when the back is raised to said second position, a leg rest hinged to the front end of the seat frame and means permitting adjustment of the slope of said leg rest relative to the seat, said leg rest being swingable backwardly to a position under the seat.

2. A chair according to claim 1, further comprising springs acting between the underframe and said side plates and tending to swing the rear portion of said plates upwardly.

3. A chair according to claim 1, further comprising a rack pivotally connected to said side plate and having a plurality of teeth, a spring-loaded latch mounted on said underframe and engageable with the teeth of said rack to hold the rack, and thereby the side plate, in selected adjusted position, and remote control means for withdrawing said latch to release said side plate.

4. A chair according to claim 1, wherein said means permitting adjustment of the leg rest comprises perforated plates rigid with the rear end of said leg rest and spring-loaded bolts on the front end of the seat frame adapted to engage selectively in said perforations to latch the leg rest in the desired angular position relative to the seat.

5. A chair having a seat and back and capable of being adjusted from a normal position to a second position with the back inclined upwardly rearwardly, comprising an underframe, horizontal coaxial pivot pins rigid with the sides of the underframe and located substantially in vertical alignment with the center of gravity of the loaded seat, a pair of vertical side plates disposed at opposite sides of said underframe, each of said side plates being F-shaped with its stem extending forwardly and its arms extending upwardly, the median arms of said plates being pivotally connected at their upper ends to said underframe by said pivot pins, a bell crank pivoted at its apex to the lower rear portion of each of said side plates and having a rearwardly extending arm pivoted to the lower end of the back frame and an upwardly extending arm pivoted to the rear portion of the seat frame, a link connected to the upper rear portion of each side plate and to the back frame respectively, the connection of said link to the back frame being at a point above that of said bell crank, a second link connecting the front end of each side plate with the forward portion of the seat frame, a spring at each side acting between the underframe and said side plates and abutments on said underframe engaging respectively said side plates, said bell cranks and said second links to hold said side plates in fixed position when said back frame and seat frame are in normal position, said bell cranks and second links being moved away from the cooperating abutments to free said side plates when said back frame is moved upwardly and said seat frame is moved forwardly to said second position, thereby permitting said side plates, together with the seat and back assembly, to rock about said pivot pins.

6. A chair having a seat and back and capable of being adjusted from a normal position to a second position with the back raised and the seat moved forwardly and to a rocking-chair position with the seat inclined downwardly rearwardly and the back inclined upwardly rearwardly, comprising an underframe, horizontal coaxial pivot pins rigid with the sides of the underframe and located substantially in vertical alignment with the center of gravity of the loaded seat, a pair of rigid frames respectively for the seat and back of the chair, a pair of vertical side plates pivoted respectively by said pivot pins on said underframe, a bell crank lever pivoted at its apex to the lower rear portion of each side plate and having a rearwardly extending arm pivoted to the lower end of the back frame and an upwardly extending arm pivoted to the rear portion of the seat frame, a link pivoted to the upper rear portion of each side plate and to the back frame respectively, the connection of said link to the back frame being at a point above that of said bell crank, a second link between the front end of each side plate and the forward portion of said seat frame, a spring at each side acting between the underframe and said side plate, and abutments on said underframe engaging respectively said side plates and said second links to hold said side plates in fixed position when said back frame and seat frame are in normal position, said second links being moved away from the cooperating abutments to free said plates when said back frame is moved upwardly and said seat frame is moved forwardly to said second position.

References Cited in the file of this patent
UNITED STATES PATENTS

| | | |
|---|---|---|
| 2,173,283 | Lorenz et al. | Sept. 19, 1939 |
| 2,474,264 | Lorenz | June 28, 1949 |
| 2,617,471 | Lorenz | Nov. 11, 1952 |
| 2,650,649 | Lorenz | Sept. 1, 1953 |